No. 846,261. PATENTED MAR. 5, 1907.
G. THOMAS.
MILK PAIL.
APPLICATION FILED JAN. 7, 1907.
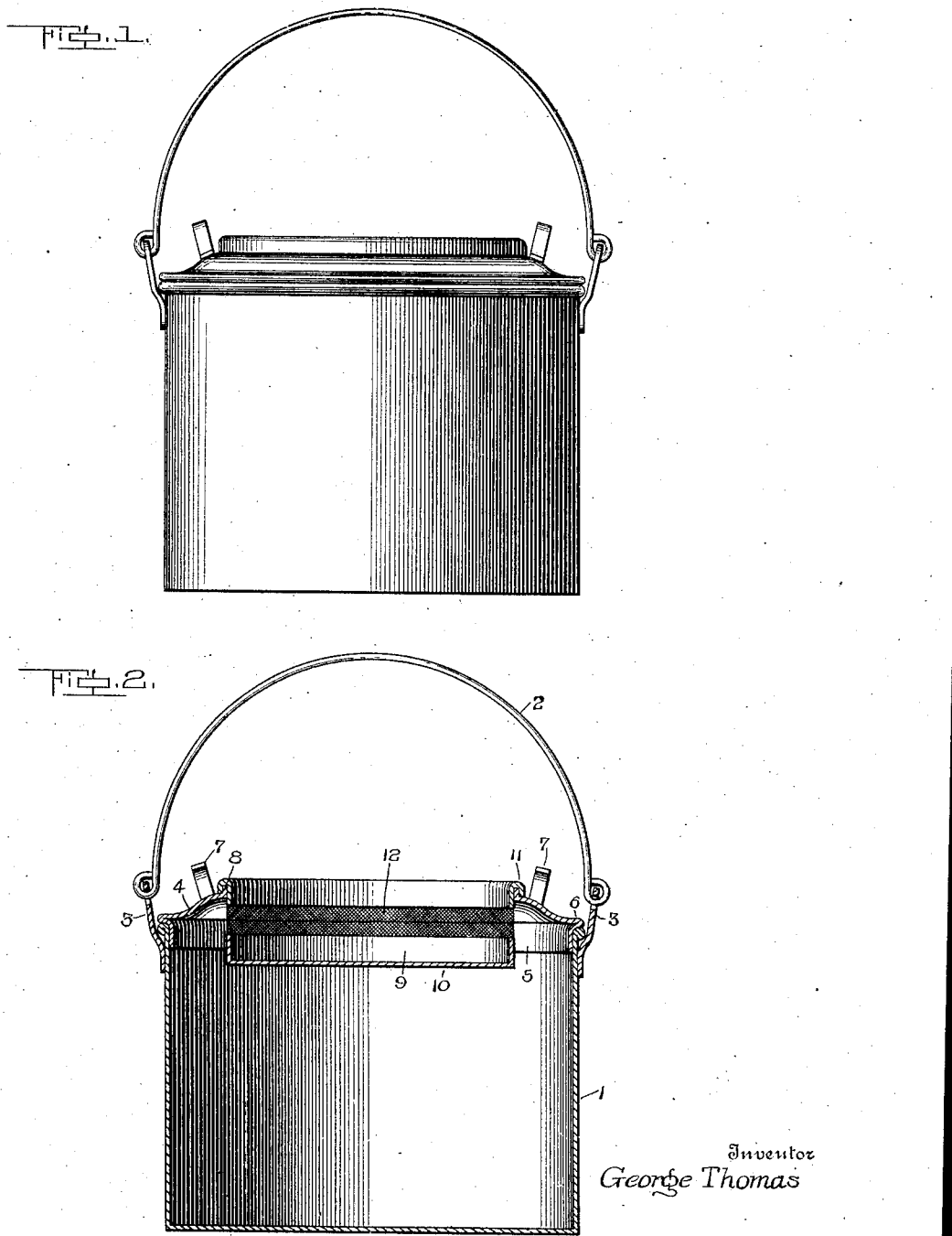

UNITED STATES PATENT OFFICE.

GEORGE THOMAS, OF ENDICOTT, VIRGINIA.

MILK-PAIL.

No. 846,261.  Specification of Letters Patent.  Patented March 5, 1907.

Application filed January 7, 1907. Serial No. 351,162.

*To all whom it may concern:*

Be it known that I, GEORGE THOMAS, a citizen of the United States, residing at Endicott, in the county of Franklin and State of Virginia, have invented new and useful Improvements in Milk-Pails, of which the following is a specificatiion.

This invention relates to milk-pails; and the object of the invention is to provide a combined lid or cover and strainer for milk-pails of such construction and formation that the strainer member is removably fitted upon the lid or cover member to facilitate its removal and cleaning and the milk is prevented from slopping over when the milk-pail is moved suddenly. Furthermore, the formation of the strainer member is such that a quantity of milk remains in the bottom portion thereof, so as to prevent the liquid from spattering during the milking operation.

With the above and other objects in view the invention consists in the novel construction, combination, and arrangement of parts hereinafter more fully illustrated, described, and claimed.

In the accompanying drawings, Figure 1 is a side view of a milk-pail embodying the invention. Fig. 2 is a vertical diametrical section through the same.

Referring to the drawings, 1 designates the body of the milk-pail, which may be of any desired size and which is preferably of cylindrical form, said pail being provided with the usual bail 2 and the bail-attaching ears 3. In connection with the pail I employ a lid or cover 4, the outer edge or rim of which is provided with a flange 5, adapted to fit into the upper end of the pail, and a projecting annular lip 6, which rests on the top edge of the pail, as clearly shown in Fig. 2. The lid or cover 4 is also provided with lifting and carrying handles 7.

In carrying out the present invention the lid or cover 4 is provided with a large central opening, and the edge of the cover bounding said opening is turned upward to form an upstanding flange 8, the purpose of which will appear. Mounted within the opening so formed is a cylindrical cup 9, the sides 10 of which stand vertically when the straining-cup is in position for use. The upper edge of the strainer-cup 9 is bent outward and recurved in a downward direction to form a continuous retainer-lip 11, which constitutes a clasp, which fits over the upstanding flange 8 and obtains a firm frictional hold thereon, whereby the strainer-cup is securely retained in position and yet adapted to be removed for the purpose of thoroughly cleaning the same.

At a point above the bottom of the cup 9 and below the top of said cup there is arranged an annular strainer 12, consisting of wire-gauze of any desired mesh, and it will now be noted that the milk will not overflow through the strainer until the level thereof reaches the strainer. This allows a sufficient quantity of milk to remain in the bottom of the strainer-cup to prevent splashing during the milking operation. The milk flows through the strainer 12 and is thereby freed from insects, dirt, and other impurities, and after the milking operation is finished the cover and strainer may be removed from the milk-pail and tilted at an angle, so as to allow the milk below the strainer to flow through the same and into the milk-pail over which the strainer is held.

I claim—

The combination with a milk-pail, of a cover removably fitted thereon and provided with a central opening bounded by an upstanding flange on the cover, and a cylindrical strainer-cup fitting in said opening and provided at its upper edge with a continuous retainer lip or clasp which fits over and around the upstanding flange of the cover, said strainer-cup being provided at a point above the bottom thereof with an annular strainer, substantially as described.

In testimony whereof I affix my signature in presence of two witnesses.

GEORGE THOMAS.

Witnesses:
 C. H. MCALEXANDER,
 L. S. THOMAS.